(12) United States Patent
Kimura et al.

(10) Patent No.: US 7,181,751 B2
(45) Date of Patent: Feb. 20, 2007

(54) OBJECTIVE-LENS DRIVING APPARATUS AND OPTICAL DISK APPARATUS

(75) Inventors: Katsuhiko Kimura, Chiyoda (JP); Seiichi Katou, Tsuchiura (JP); Hiroshi Ogasawara, Yokohama (JP)

(73) Assignees: Hitachi, Ltd., Tokyo (JP); Hitachi Media Electronics Co., Ltd., Mizusawa (JP)

( * ) Notice: Subject to any disclaimer, the term of this patent is extended or adjusted under 35 U.S.C. 154(b) by 0 days.

(21) Appl. No.: 11/514,930

(22) Filed: Sep. 5, 2006

(65) Prior Publication Data

US 2007/0006246 A1 Jan. 4, 2007

Related U.S. Application Data

(63) Continuation of application No. 10/714,944, filed on Nov. 18, 2003, now Pat. No. 7,107,602.

(30) Foreign Application Priority Data

Nov. 20, 2002 (JP) .............................. 2002-335937

(51) Int. Cl.
*G11B 7/085* (2006.01)

(52) U.S. Cl. ..................................... 720/683
(58) Field of Classification Search ................. 720/683
See application file for complete search history.

(56) References Cited

U.S. PATENT DOCUMENTS

| 4,570,249 | A | * | 2/1986 | Malissin et al. ......... 369/44.22 |
| 5,208,703 | A | | 5/1993 | Ikegame |
| 5,220,459 | A | * | 6/1993 | Ichikawa et al. ........... 359/811 |
| 5,566,149 | A | * | 10/1996 | Song ........................ 369/44.15 |
| 5,627,687 | A | | 5/1997 | Fujisawa |
| 5,663,840 | A | | 9/1997 | Matsui |
| 5,905,255 | A | | 5/1999 | Wakabayashi |
| 6,181,670 | B1 | | 1/2001 | Nagasato |
| 6,343,053 | B1 | | 1/2002 | Akanuma |
| 6,532,118 | B2 | | 3/2003 | Ohno |
| 6,625,105 | B2 | | 9/2003 | Suzuki |
| 6,639,744 | B2 | | 10/2003 | Ohno |
| 2002/0071189 | A1 | | 6/2002 | Ohno |
| 2003/0184886 | A1 | | 10/2003 | Wakabayashi |
| 2003/0218962 | A1 | * | 11/2003 | Lee et al. .................... 369/244 |

FOREIGN PATENT DOCUMENTS

| CN | 2003/437295 | 2/2003 |
| JP | 401192022 | 8/1989 |
| JP | 2001/101687 | 4/2001 |

* cited by examiner

*Primary Examiner*—Allen Cao
(74) *Attorney, Agent, or Firm*—Antonelli, Terry, Stout and Kraus, LLP.

(57) ABSTRACT

An objective-lens driving apparatus, includes an objective lens for converging light on a recording surface of an optical disk, a focusing coil having four edges for enclosing the objective lens, and two pairs of permanent magnets. The two pairs of permanent magnets are arranged so that polarities thereof are identical toward the focusing coil, with one pair of the permanent magnets arranged so as to be opposed to one edge of the focusing coil, and another pair of the permanent magnets arranged so as to be opposed to another edge of the focusing coil which is opposite to the one edge of focusing coil. An interval between two permanent magnets constituting the one pair of the permanent magnets is narrower than an interval between two permanent magnets constituting the another pair of the permanent magnets.

4 Claims, 6 Drawing Sheets

OBJECTIVE-LENS DRIVING APPARATUS AND OPTICAL DISK APPARATUS

CROSS REFERENCE TO RELATED APPLICATION

This application is a continuation of U.S. application Ser. No. 10/714,944, filed Nov. 18, 2003, now U.S. Pat. No. 7,107,602 the contents of which are incorporated herein by reference.

BACKGROUND OF THE INVENTION

The present invention relates to an objective-lens driving apparatus for use in an optical disk apparatus for recording information on the recording surface of an optical disk or for reading the information recorded thereon.

In an optical disk apparatus for recording information on a disk-shaped recording medium or for reading and reproducing the information recorded thereon, an objective-lens driving apparatus is an apparatus for driving an objective lens in the focusing direction (i.e., the direction in which the objective lens comes closer to/goes away from the recording surface of the optical disk) and in the tracking direction (i.e., the radial direction of the disk). Here, the objective lens light-converges light on the optical-disk recording surface. Generally, the objective-lens driving apparatus incorporates a movable unit with the objective lens, a supporting member for supporting this movable unit, and a magnetic circuit with a yoke and a permanent magnet. A focusing coil and a tracking coil are mounted onto the movable unit. Applying a driving current to the focusing coil drives the movable unit in the focusing direction by an electromagnetic force generated by the interaction with a magnetic flux from the permanent magnet. Similarly, applying the driving current to the tracking coil drives the movable unit in the tracking direction by an electromagnetic force generated by the interaction with the magnetic flux from the permanent magnet.

In the objective-lens driving apparatus like this, if the objective lens has been inclined, an optical aberration occurs, thereby enlarging a light-converged spot. This makes it impossible to correctly record the information on the disk, or results in a degradation in the reproduced signal.

Conventionally, there has been known the optical pick-up unit which was devised in order to suppress this inclination of the objective lens (e.g., JP-A-2001-101687). This optical pick-up unit incorporates the tracking coil, the focusing coil, the objective lens, a lens holder, a damper base for supporting the lens holder in a movable manner via plural suspension wires, the yoke, and the permanent magnet. Moreover, in the optical pick-up unit, the configuration size of the permanent magnet is set so that electromagnetic forces, which exert themselves on the tracking coil and/or the focusing coil thereby to cause the optical axis of the objective lens to be inclined from its reference axis, will substantially cancel out each other.

In the above-described related art, the configuration size of the permanent magnet is set at a certain value. This setting has canceled out moments generated at the focusing coil and the tracking coil when the objective lens is displaced, thereby suppressing the inclination of the objective lens. This setting, however, imposes the restrictions on the sizes of the permanent magnet, the focusing coil, and the tracking coil. As a consequence, the design's degree-of-freedom has been limited, and there has been acquired only effect that is not necessarily sufficient in an aspect of the apparatus's downsizing.

BRIEF SUMMARY OF THE INVENTION

It is an object of the present invention to provide an objective-lens driving apparatus and an optical disk apparatus where, even when the objective lens is displaced, the inclination of the objective lens become small, and the dependency on the size of magnetic circuit become low.

In order to accomplish the above-described object, in the present invention, there is provided an objective-lens driving apparatus that incorporates the following configuration components: an objective lens for light-converging light on the recording surface of an optical disk, a lens holder for holding the objective lens, a focusing coil and a tracking coil mounted onto the lens holder, plural supporting members for supporting a movable unit, which incorporates the lens holder, in a movable manner in the focusing direction and the tracking direction with respect to a fixed unit, a yoke member having a magnetic substance, and plural permanent magnets located in parallel to the tracking direction and on both ends of the movable unit. Moreover, in the objective-lens driving apparatus, on one side of the movable unit parallel to the tracking direction, the permanent magnets are located on both ends of the movable unit. Simultaneously, on the other side of the movable unit parallel to the tracking direction, the permanent magnets is located at a position closer to the center of the movable unit.

With the permanent magnets, the focusing coil and the tracking coil arranged as described above, this configuration makes it possible to reduce each moment generated at each of the focusing coil and the tracking coil when the objective lens is displaced. Accordingly, it becomes possible to implement the objective-lens driving apparatus and, eventually, the optical disk apparatus where the inclination of the objective lens becomes small.

Other objects, features and advantages of the invention will become apparent from the following description of the embodiments of the invention taken in conjunction with the accompanying drawings.

DETAILED DESCRIPTION OF THE INVENTION

Figure 1:
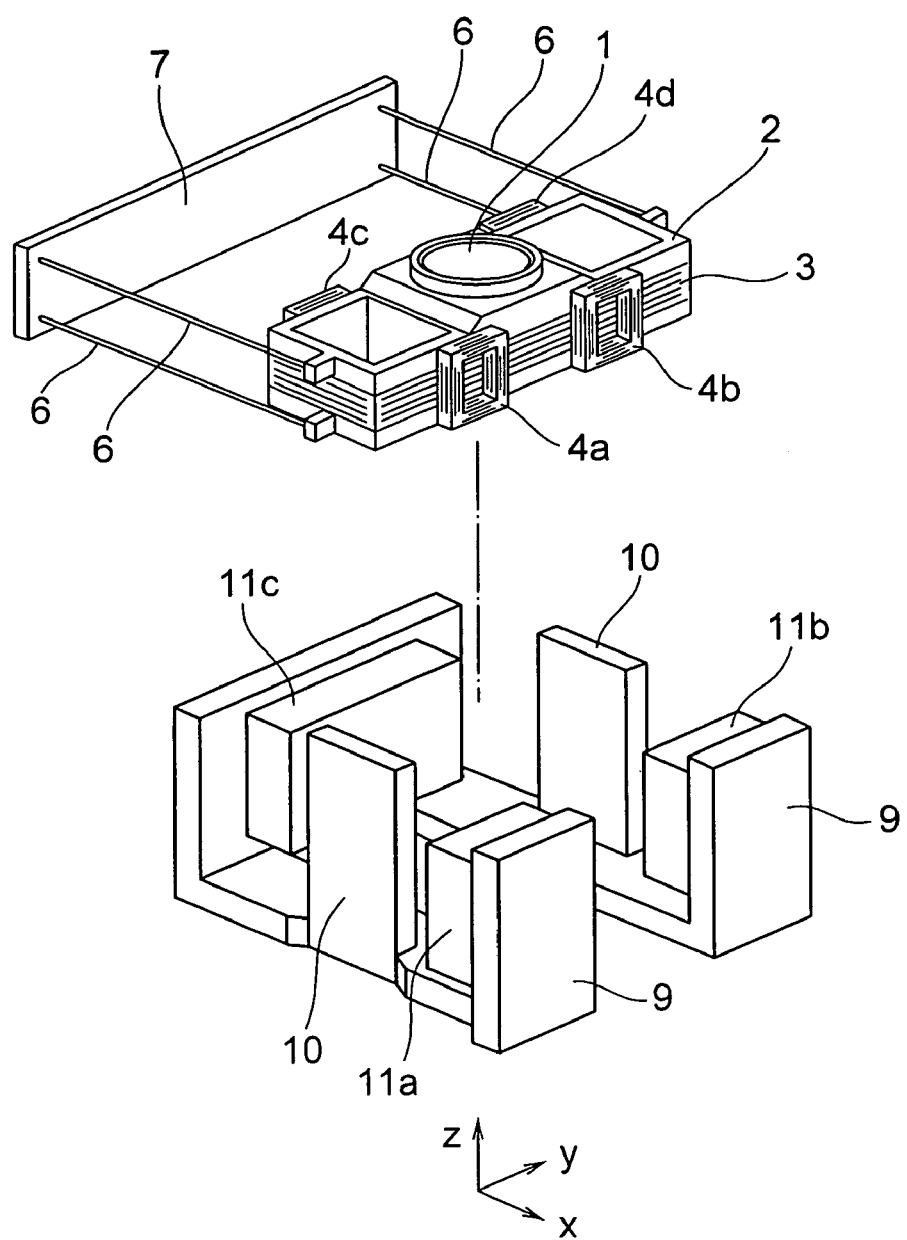
FIG. 1 is a diagram for illustrating an embodiment of the objective-lens driving apparatus according to the present invention.

Referring to the drawings, the explanation will be given below concerning embodiments of the present invention. The optical disk apparatus according to the present invention drives the objective lens by the objective-lens driving apparatus so as to light-converge light on the recording surface of the optical disk, thereby performing the reproduction of information.

FIG. 1 is an exploded perspective view for illustrating the configuration of an embodiment of the objective-lens driving apparatus. In FIG. 1, the x-axis direction is the tangent direction of a not-illustrated disk. The y-axis direction is the tracking direction, i.e., the radial direction of the disk. The z-axis direction is the focusing direction, i.e., the optical-axis direction of an objective lens 1.

A focusing coil 3, i.e., a driving coil, is wound around a lens holder 2 for holding the objective lens 1. Also, four tracking coils 4a, 4b, 4c and 4d are mounted onto the lens holder 2. One ends of wire-like supporting members 6 having electrical conductivity are fixed to a fixed unit 7, and the other ends thereof are fixed to the side of the lens holder 2.

Here, the objective lens 1, the lens holder 2, the focusing coil 3 and the tracking coils 4a to 4d turn out to become a movable unit.

Permanent magnets 11a, 11b, and 11c whose magnetization directions become identical to the x-axis direction in the drawing are mounted onto and fixed to outer yokes 9, i.e., yoke members including a magnetic substance, on both ends of the movable unit parallel to the tracking direction.

From bottom surfaces of the outer yokes 9, inner yokes 10, i.e., yoke members including a magnetic substance similarly, are located such that the inner yokes 10 are positioned at the inner side of the focusing coil 3. This configuration forms a magnetic circuit where magnetic fluxes from the permanent magnets 11a to 11c pass through to the inner yokes 10 and the outer yokes 9.

Here, on one side of the movable unit parallel to the tracking direction which is the y-axis direction in the drawing, the permanent magnets 11a and 11b are arranged apart on both ends of the movable unit. Simultaneously, on the other side of the movable unit parallel to the tracking direction, the permanent magnet 11c is arranged at the center of the movable unit.

Figure 2:
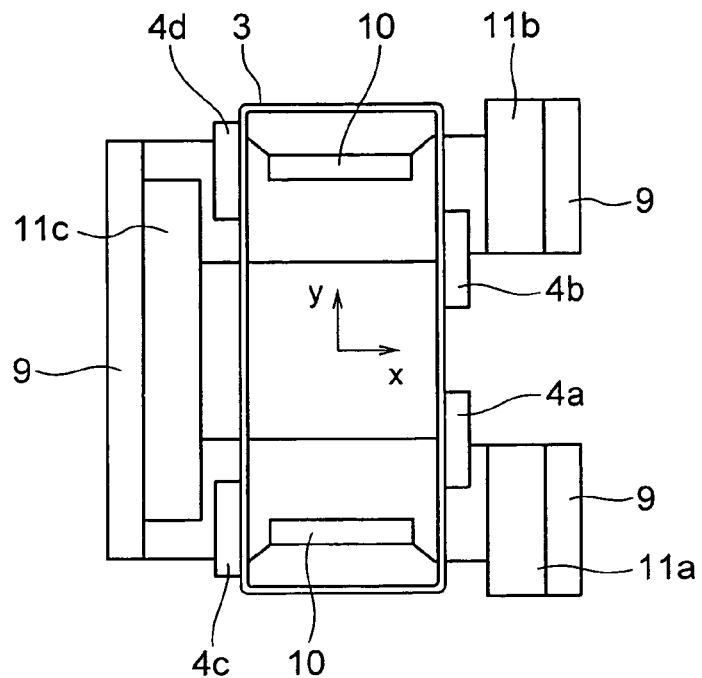
FIG. 2 is a top view for illustrating a major portion in FIG. 1.

FIG. 2 is a top view of the objective-lens driving apparatus illustrated in FIG. 1. Here, in order to make the drawing easy to see, there are illustrated only the focusing coil 3, the tracking coils 4a to 4d, the permanent magnets 11a to 11c, the outer yokes 9 and the inner yokes 10. As illustrated in FIG. 2, the tracking coils 4a and 4b are located at positions closer to the center of the movable unit with respect to the permanent magnets 11a and 11b arranged apart in the tracking direction. The tracking coils 4c and 4d are arranged at the outer side of the movable unit with respect to the permanent magnet 11c. Namely, the permanent magnets 11a and 11b confront the coil-wound portions positioned at the outer sides of the tracking coils 4a and 4b, and the permanent magnet 11c confronts the coil-wound portion positioned at the inner side of the tracking coils 4c and 4d.

Figure 3:
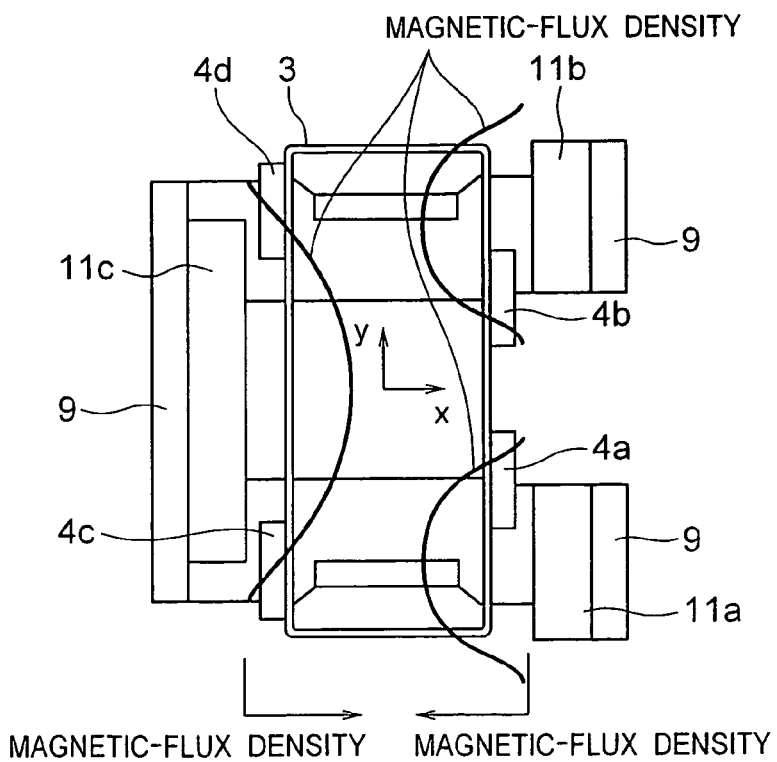
FIG. 3 is a top view for illustrating a magnetic-flux density distribution in the embodiment in FIG. 1.
Figure 4:
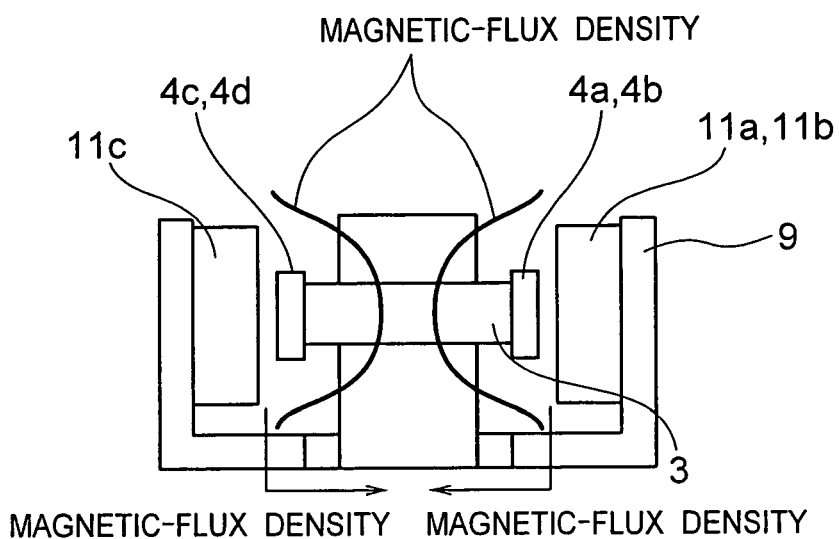
FIG. 4 is a side view for illustrating the magnetic-flux density distribution in the embodiment in FIG. 1.

In the objective-lens driving apparatus configured as described above, the magnetic-flux density distribution turns out to become one as illustrated in a top view in FIG. 3 and a side view in FIG. 4. Each magnetic-flux density is the largest at the central portion of each permanent magnet, and becomes smaller and smaller at a more peripheral portion of each permanent magnet. Accordingly, as illustrated in FIG. 3, the distribution turns out to be as follows: on the side of the permanent magnets 11a and 11b, the magnetic-flux density is large on both ends of the focusing coil 3. On the side of the permanent magnet 11c, the magnetic-flux density is large at the center of the focusing coil 3.

Figure 5:
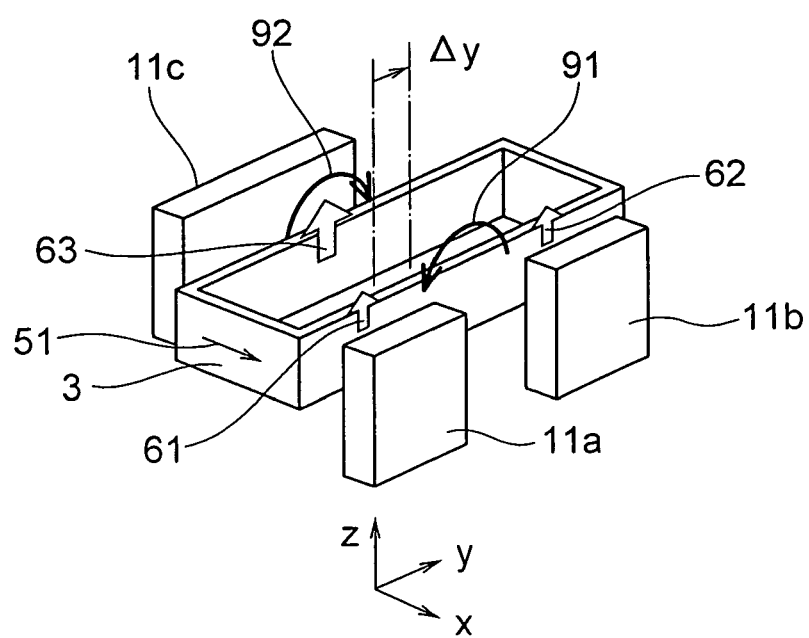
FIG. 5 is a diagram for explaining a force that exerts itself on a focusing coil in the embodiment in FIG. 1.

Concerning the polarities of the permanent magnets 11a to 11c, the polarities on the closer sides to the focusing coil 3 are set to be the N poles, and the polarities on the sides of the outer yokes 9 are set to be the S poles. Then, as illustrated in FIG. 5, causing an electric current 51 to flow through the focusing coil 3 generates a z-direction force at the focusing coil 3, thereby driving the movable unit in the z-axis direction which is the focusing direction. Also, as illustrated in FIG. 6A and FIG. 6B, causing an electric current 52 to flow through the tracking coils 4a to 4d generates y-direction forces at the tracking coils 4a to 4d, thereby driving the movable unit in the y-axis direction which is the tracking direction.

Here, assuming that the displacement amount in the tracking direction is equal to $\Delta y$, and that the displacement amount in the focusing direction is equal to $\Delta z$. Then, as illustrated in FIG. 5, the side of the focusing coil 3 confronting the permanent magnets 11a and 11b goes away from the permanent magnet 11a, and confronts the permanent magnet 11b entirely. As a result, a force 61 generated at the portion confronting the permanent magnet 11a becomes smaller, and a force 62 generated at the portion confronting the permanent magnet 11b becomes larger. This generates a moment 91 by the center of the movable unit around the x axis. Meanwhile, on the side of the focusing coil 3 confronting the permanent magnet 11c, the magnetic-flux density distribution from the permanent magnet 11c does not change, and the center of the movable unit is displaced by $\Delta y$. This, based on a force 63 in the focusing direction and the distance $\Delta y$ with the center of the movable unit, generates a moment 92 by the center of the movable unit around the x axis. At this time, the moment 91 and the moment 92 become opposite to each other in their directions. This condition reduces a resultant moment that exerts itself on the focusing coil 3 as a whole. Namely, it becomes possible to reduce the force that causes the movable unit to be inclined.

Figure 6A:
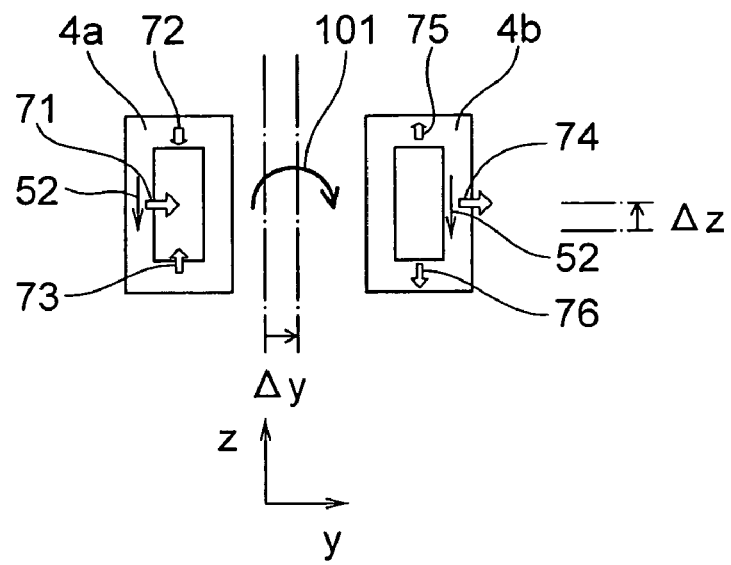
FIG. 6A and FIG. 6B are diagrams for explaining a force that exerts itself on a tracking coil in the embodiment in FIG. 1.
Figure 6B:
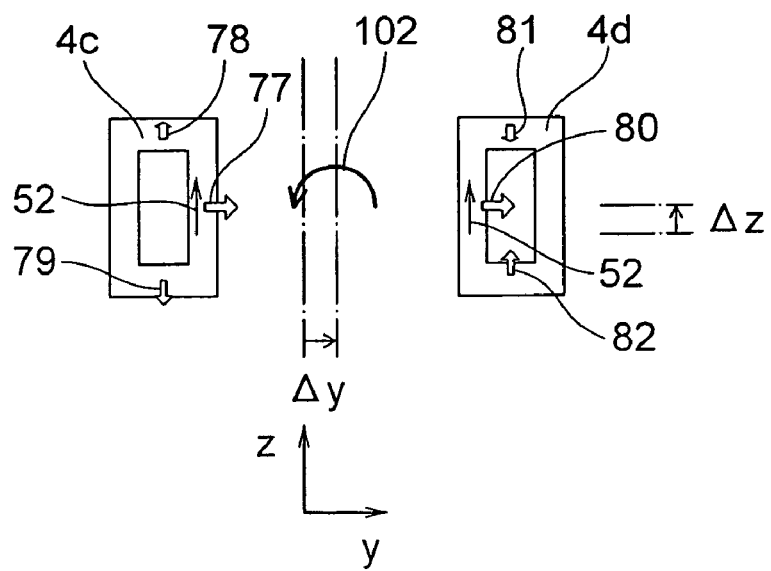

Also, in the tracking coils 4a to 4d, as illustrated in FIG. 6A and FIG. 6B, in addition to the driving forces 71, 74, 77, and 80 in the tracking direction, forces 72, 75, 78, and 81 are generated at the upper-side portions of the tracking coils 4a to 4d, and forces 73, 76, 79, and 82 are generated at the lower-side portions thereof. At this time, the movable unit is displaced by $\Delta z$ in the focusing direction. As a result of this, the forces generated at the lower-side portions of the tracking coils 4a to 4d become larger than the forces generated at the upper-side portions thereof. This generates a moment 101 and a moment 102 by the center of the movable unit around the x axis. Here, however, the portions confronting the permanent magnets 11a and 11b differ from the portion confronting the permanent magnet 11c in that the portions are positioned at the outer sides of the tracking coils 4a and 4b and the portion is positioned at the inner side of the tracking coils 4c and 4d. This makes the generated forces opposite to each other in their directions. Accordingly, the moment 101 generated at the tracking coils 4a and 4b and the moment 102 generated at the tracking coils 4c and 4d become opposite to each other in their directions. This condition reduces a resultant moment that exerts itself on the tracking coils 4a to 4d as a whole. Namely, it becomes possible to reduce the forces that cause the movable unit to be inclined.

As having been described so far, in the present embodiment, on one side of the movable unit parallel to the tracking direction, the permanent magnets 11a and 11b are arranged apart on both ends of the movable unit. Simultaneously, on the other side of the movable unit parallel to the tracking direction, the permanent magnet 11c is arranged at the center of the movable unit. This configuration makes it possible not only to reduce the moments generated at the focusing coil 3, but also to reduce the moments generated at the tracking coils 4a to 4d. Consequently, it becomes possible to implement the objective-lens driving apparatus and, eventually, the optical disk apparatus where the inclination of the objective lens is found to be small.

Figure 7:
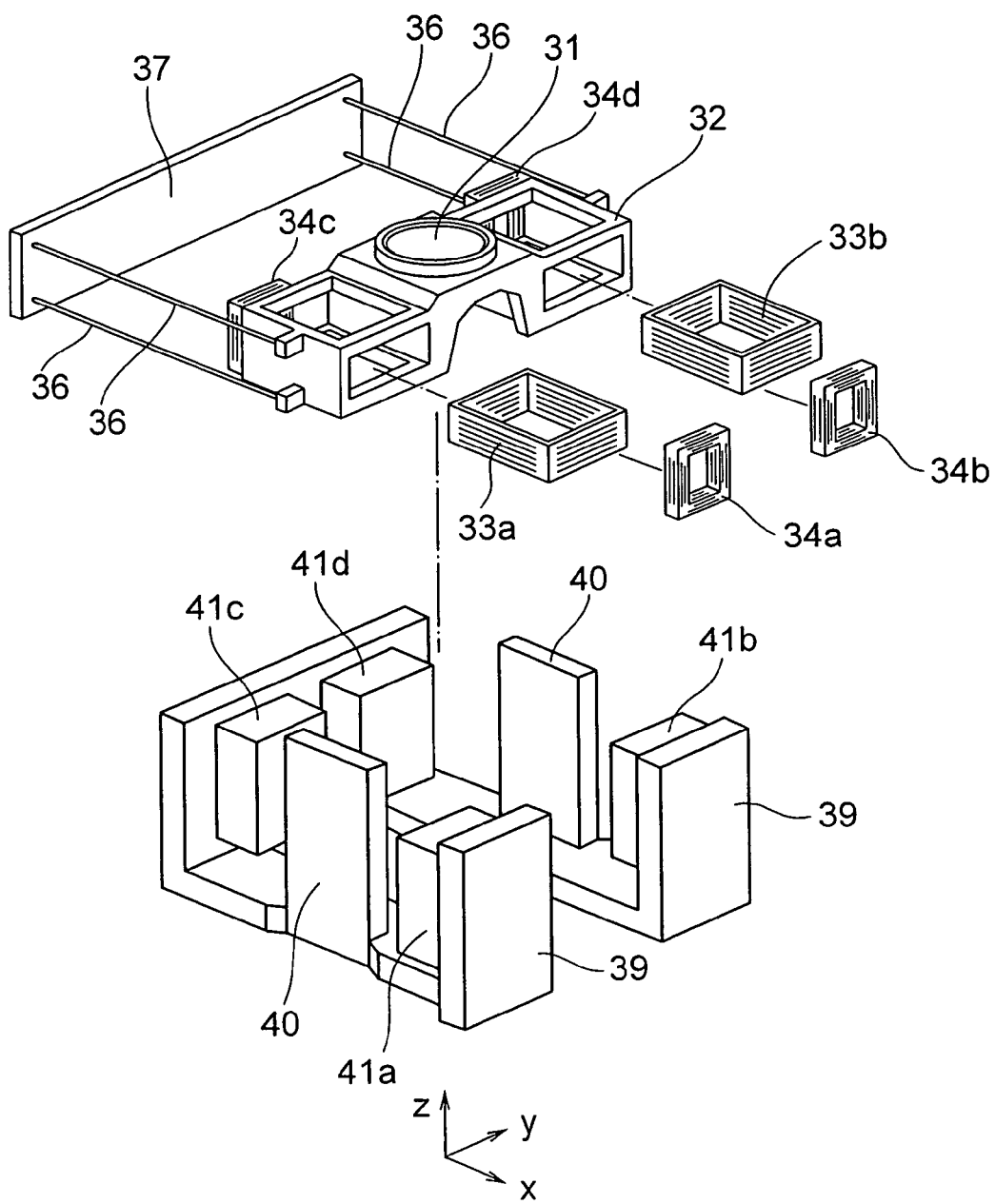
FIG. 7 is a diagram for illustrating another embodiment of the objective-lens driving apparatus according to the present invention.
Figure 8:
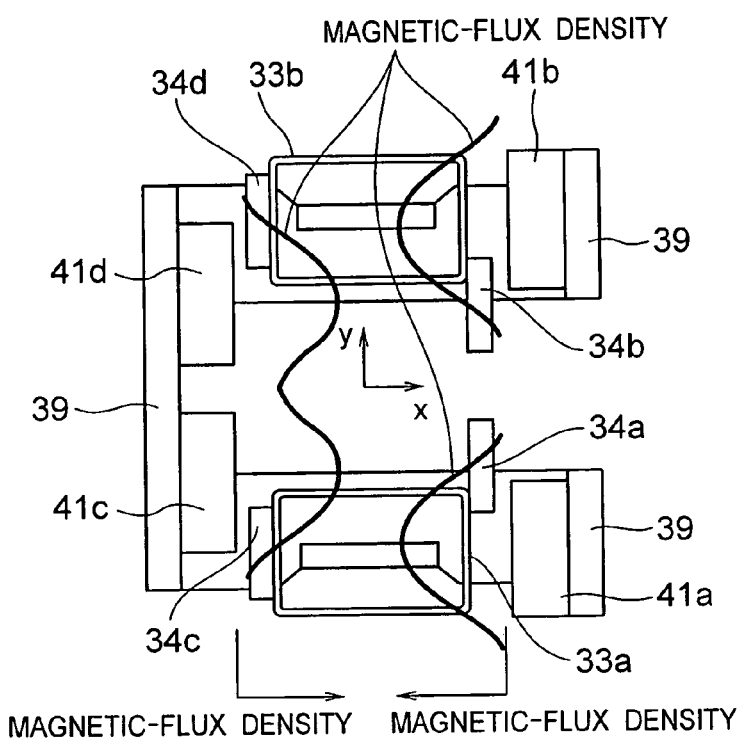
FIG. 8 is a top view for illustrating a magnetic-flux density distribution in the embodiment in FIG. 7.

Next, referring to FIG. 7 and FIG. 8, the explanation will be given below concerning another embodiment of the present invention. FIG. 7 is an exploded perspective view for illustrating the configuration of the objective-lens driving apparatus in the present embodiment. FIG. 8 is a top view for illustrating its major portion and its magnetic-flux density distribution.

Two focusing coils 33a and 33b, i.e., driving coils, and four tracking coils 34a, 34b, 34c and 34d are mounted onto a lens holder 32 for holding an objective lens 31. One ends of wire-like supporting members 36 having electrical conductivity are fixed to a fixed unit 37, and the other ends thereof are fixed to the side of the lens holder 32.

Permanent magnets 41a, 41b, 41c and 41d whose magnetization directions become identical to the x-axis direction in the drawing are mounted onto and fixed to outer yokes 39, i.e., yoke members including a magnetic substance, on both ends of the movable unit parallel to the tracking direction.

From bottom surfaces of the outer yokes 39, inner yokes 40, i.e., yoke members including a magnetic substance similarly, are arranged such that the inner yokes 40 are positioned at the inner side of the focusing coils 33a and 33b.

Here, on one side of the movable unit parallel to the tracking direction which is the y-axis direction in the drawing, the permanent magnets 41a and 41b are arranged apart on both ends of the movable unit. Simultaneously, on the other side of the movable unit parallel to the tracking direction, the permanent magnets 41c and 41d are arranged at positions closer to the center of the movable unit.

As illustrated in FIG. 8, the tracking coils 34a and 34b are arranged at positions closer to the center of the movable unit with respect to the permanent magnets 41a and 41b arranged apart on both ends of the movable unit. The tracking coils 34c and 34d are arranged at the outer side of the movable unit with respect to the permanent magnets 41c and 41d. Namely, the permanent magnets 41a and 41b confront the coil-wound portions positioned at the outer sides of the tracking coils 34a and 34b, and the permanent magnets 41c and 41d confront the coil-wound portions positioned at the inner sides of the tracking coils 34c and 34d.

The magnetic-flux density distribution turns out to be as follows: on the side of the permanent magnets 41a and 41b, the magnetic-flux density is large on both ends of the movable unit. On the side of the permanent magnets 41c and 41d, the magnetic-flux density exhibits two peaks at positions closer to the center of the movable unit.

The present embodiment differs from the first embodiment in that the focusing coil is divided into the two units, and that there are provided the four permanent magnets. However, on one side of the movable unit parallel to the tracking direction, the permanent magnets 41a and 41b are arranged apart on both ends of the movable unit. Simultaneously, on the other side of the movable unit parallel to the tracking direction, the permanent magnets 41c and 41d are arranged at the positions closer to the center of the movable unit than both ends thereof. This configuration allows the implementation of basically the same effect concerning a reduction in moments generated at the focusing coils 33a and 33b when the objective lens is displaced, and a reduction in moments generated at the tracking coils 34a to 34d at that time.

Moreover, the two focusing coils 33a and 33b are arranged in a manner of being apart from each other. This configuration allows the creation of a space within the side surface of the movable unit, thereby making it possible to permit light to pass through the movable unit. Accordingly, it becomes possible to implement the fabrication of a thin-type driving apparatus.

Also, the two permanent magnets are each arranged on both ends of the movable unit. This configuration makes it possible to make the size of the permanent magnets 41a and 41b identical or substantially identical to the size of the permanent magnets 41c and 41d. This, further, allows an effect of facilitating the maintenance of a balance among the driving forces.

Figure 9:
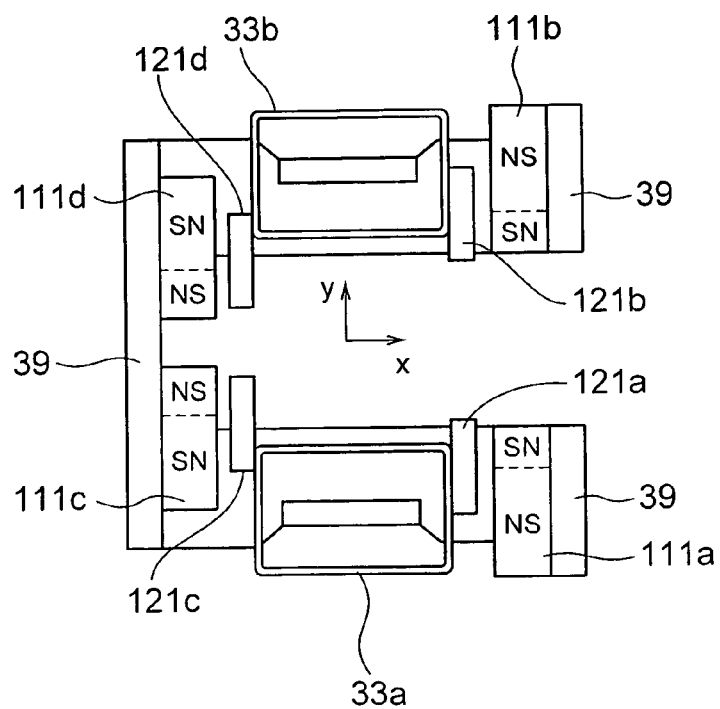
FIG. 9 is a diagram for illustrating still another embodiment of the objective-lens driving apparatus according to the present invention.

Next, referring to FIG. 9, the explanation will be given below concerning still another embodiment of the present invention. FIG. 9 is a top view for illustrating a major portion of the objective-lens driving apparatus in the present embodiment.

In the present embodiment, each of permanent magnets 111a, 111b, 111c and 111d is formed as a double-pole-magnetized permanent magnet. In addition, each of tracking coils 121a, 121b, 121c and 121d is located in a manner of confronting each of boundary portions of the double magnetic poles. The other configuration is the same as the one in FIG. 7 and FIG. 8, and thus the explanation thereof will be omitted here.

The employment of this configuration allows a characteristic that, in each of the tracking coils 121a, 121b, 121c and 121d, the portion generating a driving force in the tracking direction includes two sides. This characteristic makes it possible to increase the driving force in the tracking direction, thereby allowing the fabrication of the objective-lens driving apparatus having a high driving efficiency, i.e., a small power consumption.

According to the present invention, it becomes possible to provide the objective-lens driving apparatus and the optical disk apparatus where, even when the objective lens is displaced, the inclination of the objective lens is small.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An objective-lens driving apparatus, comprising:
   an objective lens for converging light on a recording surface of an optical disk;
   a focusing coil having four edges for enclosing the objective lens; and
   two pairs of permanent magnets, wherein the two pairs of permanent magnets are arranged so that polarities thereof are identical toward the focusing coil;

one pair of the permanent magnets are arranged so as to be opposed to one edge of the focusing coil;

another pair of the permanent magnets are arranged so as to be opposed to another edge of the focusing coil which is opposite to the one edge of focusing coil; and an interval between two permanent magnets constituting the one pair of the permanent magnets is narrower than an interval between two permanent magnets constituting the another pair of the permanent magnets.

2. The apparatus according to claim 1, wherein a direction of the one edge of the focusing coil and a direction of alignment of the two permanent magnets constituting the another pair of permanent magnets, are tracking directions for the optical disk.

3. An objective-lens driving apparatus, according to claim 1, further comprising two pairs of tracking coils, wherein one pair of tracking coils is arranged on the one edge of the focusing coil, the other pair of tracking coils is arranged on an edge which is opposite to the one edge of the focusing coil, and an interval between two tracking coils constituting the one pair of tracking coils is wider than an interval between two tracking coils constituting the other pair of tracking coils.

4. An objective-lens driving apparatus, according to claim 2, further comprising two pairs of tracking coils, whereon one pair of tracking coils is arranged on the one edge of the focusing coil, the other pair of tracking coils is arranged on an edge which is opposite to the one edge of the focusing coil, and an interval between the two tracking coils constituting the one pair of tracking coils is wider than an interval between two tracking coils constituting the other pair of tracking coils.

* * * * *